US012620320B1

(12) United States Patent
Ang et al.

(10) Patent No.: US 12,620,320 B1
(45) Date of Patent: May 5, 2026

(54) CONTACT CENTER QUALITY MANAGEMENT CONTROL USING GENERATIVE ARTIFICIAL INTELLIGENCE

(71) Applicant: Zoom Communications, Inc., San Jose, CA (US)

(72) Inventors: Ryan Christopher Ang, Coon Rapids, MN (US); Periyaven Naiken Gopalla, Burlingame, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/649,300

(22) Filed: Apr. 29, 2024

Related U.S. Application Data

(60) Provisional application No. 63/530,837, filed on Aug. 4, 2023.

(51) Int. Cl.
| | |
|---|---|
| *G09B 5/02* | (2006.01) |
| *G06F 40/40* | (2020.01) |
| *G06Q 10/0639* | (2023.01) |
| *H04L 12/18* | (2006.01) |
| *H04M 3/51* | (2006.01) |

(52) U.S. Cl.
CPC .............. *G09B 5/02* (2013.01); *G06F 40/40* (2020.01); *G06Q 10/06395* (2013.01); *G06Q 10/06398* (2013.01); *H04L 12/1831* (2013.01); *H04M 3/5175* (2013.01); *H04M 3/5191* (2013.01); *H04M 2203/403* (2013.01)

(58) Field of Classification Search
CPC ............ G09B 5/02; G09B 19/00; G06F 40/40
See application file for complete search history.

(56) References Cited

U.S. PATENT DOCUMENTS

| | | | |
|---|---|---|---|
| 6,115,693 A | 9/2000 | McDonough et al. | |
| 7,424,715 B1 * | 9/2008 | Dutton .................. | G06Q 10/10 |
| | | | 379/265.09 |
| 10,652,391 B2 | 5/2020 | Miller et al. | |
| 10,841,428 B2 | 11/2020 | McCoy | |

(Continued)

OTHER PUBLICATIONS

Sprinklr, Call center quality management, https://www.sprinklr.com/cxm/call-center-quality-management/, Aksheeta Tyagi, Aug. 3, 2023, 5 pages.

(Continued)

*Primary Examiner* — Peter R Egloff
(74) *Attorney, Agent, or Firm* — Young Basile Hanlon & MacFarlane, P.C.

(57) ABSTRACT

A quality management output relative to agent performance during a contact center interaction is generated using a trained generative artificial intelligence model to automate the reporting and further action of such quality management output. Recording information associated with a contact center interaction between an agent and an end user is obtained. The recording information is processed using a generative artificial intelligence model to determine a quality management output for the contact center interaction. An agent report is then generated based on the quality management output and associated materials and provided to the agent, and, optionally, to a supervisor device associated with the agent. In some cases, a simulated contact center interaction may be generated to further train the agent based on the quality management output.

20 Claims, 8 Drawing Sheets

(56) References Cited

U.S. PATENT DOCUMENTS

| | | | |
|---|---|---|---|
| 11,210,677 B2 | 12/2021 | Jones et al. | |
| 2007/0198329 A1* | 8/2007 | Lyerly ................ | G06Q 10/0639 |
| | | | 705/7.42 |
| 2007/0198330 A1 | 8/2007 | Korenblit et al. | |
| 2019/0109803 A1* | 4/2019 | Akkiraju ................. | G09B 5/02 |
| 2022/0036277 A1* | 2/2022 | Ranganathan ......... | H04M 3/51 |
| 2022/0311864 A1* | 9/2022 | Chalapathy ............ | G06N 20/00 |
| 2023/0080724 A1* | 3/2023 | Stoops ..................... | G09B 7/02 |
| 2024/0211690 A1* | 6/2024 | Faizakof .......... | G06V 30/19093 |
| 2024/0273584 A1* | 8/2024 | Gonier .............. | G06Q 30/0282 |
| 2024/0428003 A1* | 12/2024 | Kakodkar ............ | G06Q 30/016 |

OTHER PUBLICATIONS

Invoca Blog, How to Improve the Call Center Quality Management Process, https://www.invoca.com/blog/improve-call-center-quality-management?gad_source=1&gclid= EAlalQobChMIz9y66ZLohQMVJ0X_ AR0kgQZCEAAYAiAAEgKE5PD_BWE, Jane Irene Kelly, May 24, 2023, 6 pages.

* cited by examiner

600

700

702

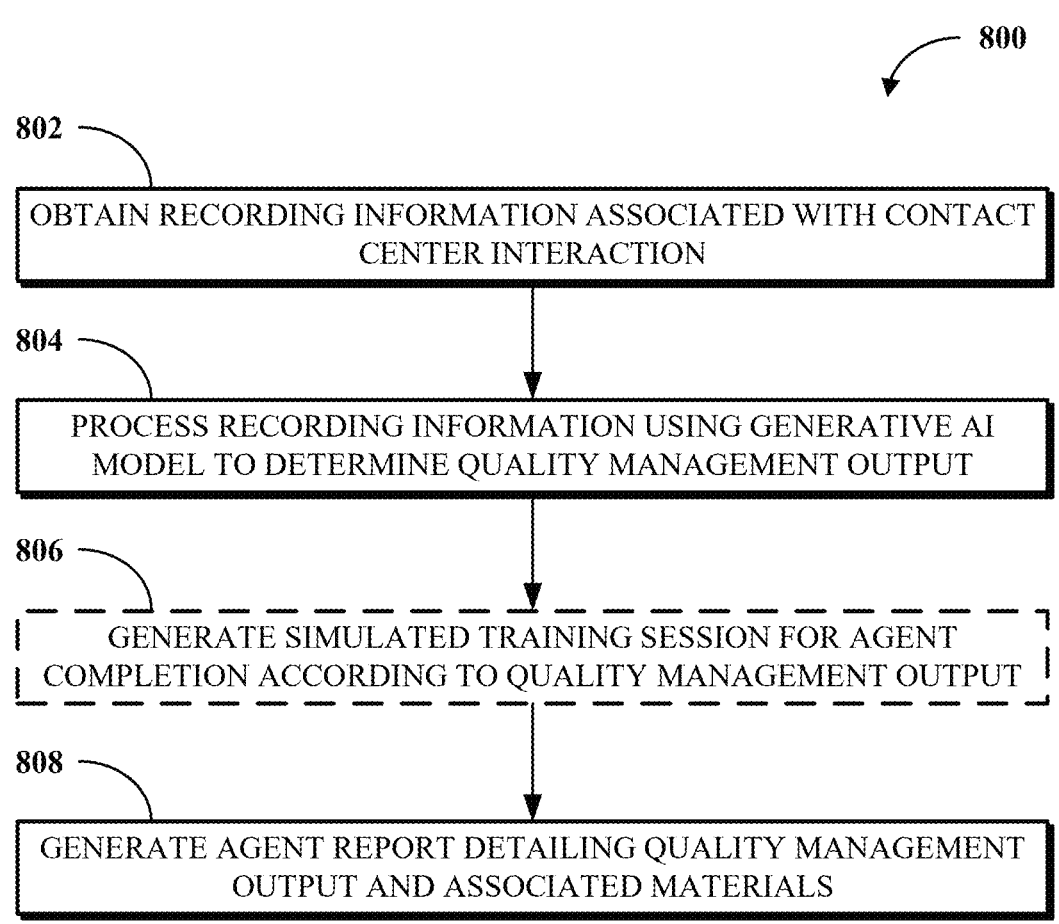

800

802

OBTAIN RECORDING INFORMATION ASSOCIATED WITH CONTACT
CENTER INTERACTION

804

PROCESS RECORDING INFORMATION USING GENERATIVE AI
MODEL TO DETERMINE QUALITY MANAGEMENT OUTPUT

806

GENERATE SIMULATED TRAINING SESSION FOR AGENT
COMPLETION ACCORDING TO QUALITY MANAGEMENT OUTPUT

808

GENERATE AGENT REPORT DETAILING QUALITY MANAGEMENT
OUTPUT AND ASSOCIATED MATERIALS

FIG. 8

CONTACT CENTER QUALITY MANAGEMENT CONTROL USING GENERATIVE ARTIFICIAL INTELLIGENCE

CROSS-REFERENCE TO RELATED APPLICATION(S)

This application claims the benefit of U.S. Provisional Application Ser. No. 63/530,837, filed Aug. 4, 2023, the entire disclosure of which is herein incorporated by reference.

FIELD

This disclosure generally relates to contact center quality management control, and, more specifically, to generating a quality management output relative to agent performance during a contact center interaction using a trained generative artificial intelligence (AI) model and automating the reporting and further action of such quality management output.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8 is a flowchart of an example of a technique for contact center quality management control.

DETAILED DESCRIPTION

Figure 1:
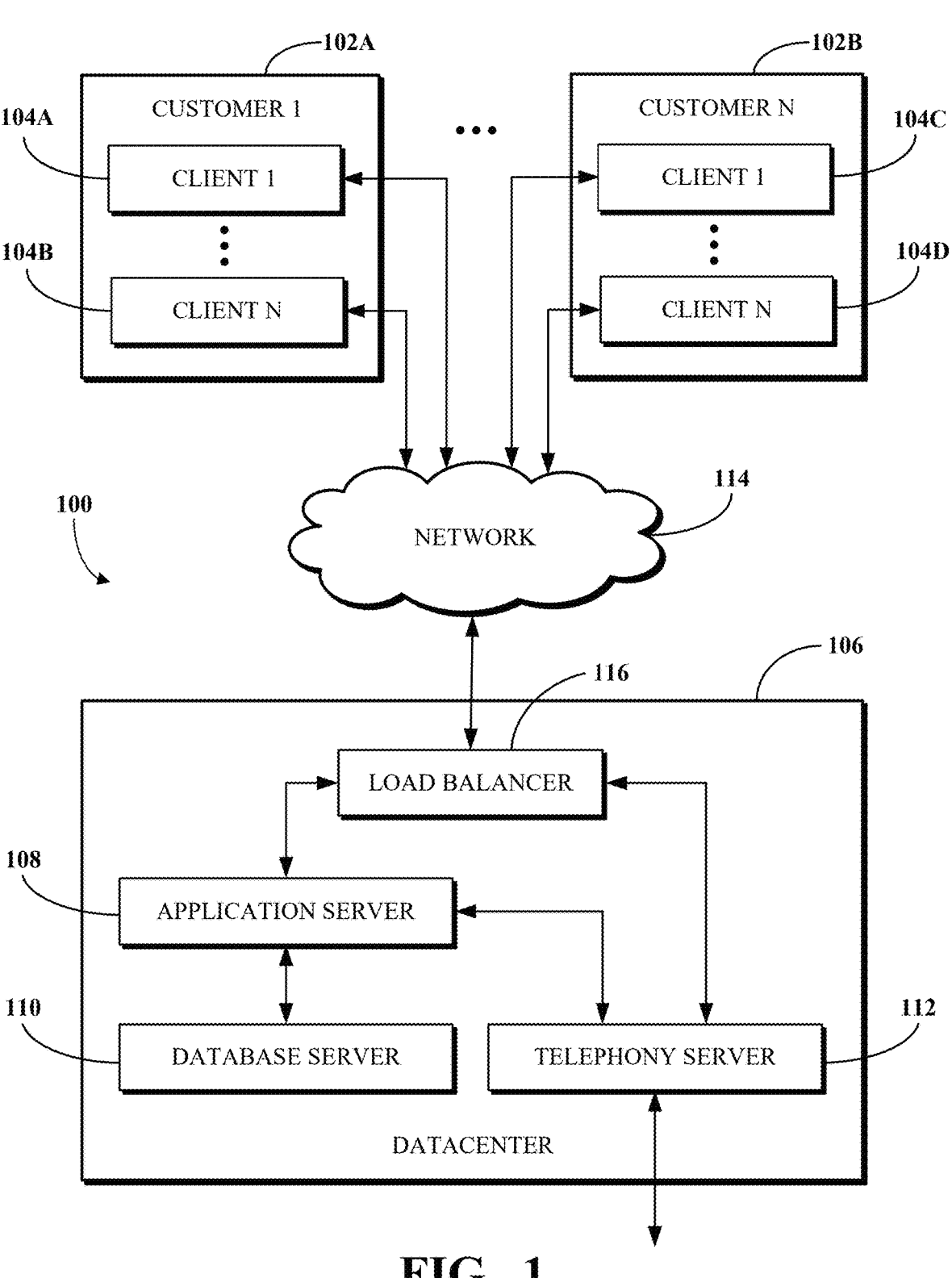
FIG. 1 is a block diagram of an example of an electronic computing and communications system.

The use of contact centers by or for service providers is becoming increasingly common to address customer support requests over various modalities, including telephony, video, text messaging, chat, and social media. In one example, a contact center may be implemented by an operator of a software platform, such as a unified communications as a service (UCaaS) platform or a contact center as a service (CCaaS) platform, for a customer of the operator. Users of the customer may engage with the contact center to address support requests over one or more communication modalities enabled for use with the contact center by the software platform. In another example, the operator of such a software platform may implement a contact center to address customer support requests related to the software platform itself.

A contact center may utilize one or more quality management mechanisms to validate that agents of the contact center are providing high quality service to its end users. Generally, quality management in the contact center context refers to undertakings for ensuring that customer interactions with a contact center meet a defined quality standard within all communication modalities and across all agents of the contact center. These undertakings result in high end user satisfaction with their contact center interactions, improved agent efficacy at addressing end user questions and requests, and previously unnoticed product and operational issues being identified. Conventional quality management approaches require user action, typically involving a supervisor or other managerial personnel manually defining a set of standards to which to hold their agents and thereafter evaluating agent performance by manually reviewing recordings of interactions between the agents and respective end users.

While such approaches may yield satisfactory results, they suffer from drawbacks based on the required manual user action. For example, such manual approaches may often or at least from time to time fail to accurately consider or characterize certain agent activity or speech, whether in isolated circumstances or as a behavioral pattern. In doing so, conventional quality management approaches risk allowing false positives or false negatives that could otherwise be caught and addressed and which, by not being addressed, may result in decreased agent performance quality. In another example, such manual approaches require that the supervisor or other managerial personnel take the time necessary to produce written output for the subject agent to review and that they thereafter follow up with the agent to ensure that the agent has acted on that output. However, due to memory lapses, time constraints, or other factors, such written outputs may sometimes not be produced and thus agents may not receive quality management feedback at all.

Implementations of this disclosure address problems such as these by generating a quality management output relative to agent performance during a contact center interaction and automating the reporting and further action of such quality management output. A quality management output relative to agent performance during a contact center interaction is generated using a trained generative artificial intelligence model to automate the reporting and further action of such quality management output. Recording information associated with a contact center interaction (e.g., a completed contact center interaction) between an agent and an end user is obtained. The recording information is processed using a generative artificial intelligence model to determine a quality management output for the contact center interaction. An agent report based on the quality management output and associated materials (e.g., for automatic actioning by the agent) is then generated and provided to the agent, and, optionally, to a supervisor device associated with the agent. In some cases, a simulated contact center interaction may be generated to further train the agent based on the quality management output.

As described throughout this disclosure, the implementations hereof may include or otherwise use one or more artificial intelligence and/or machine learning (AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for contact center quality management control. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
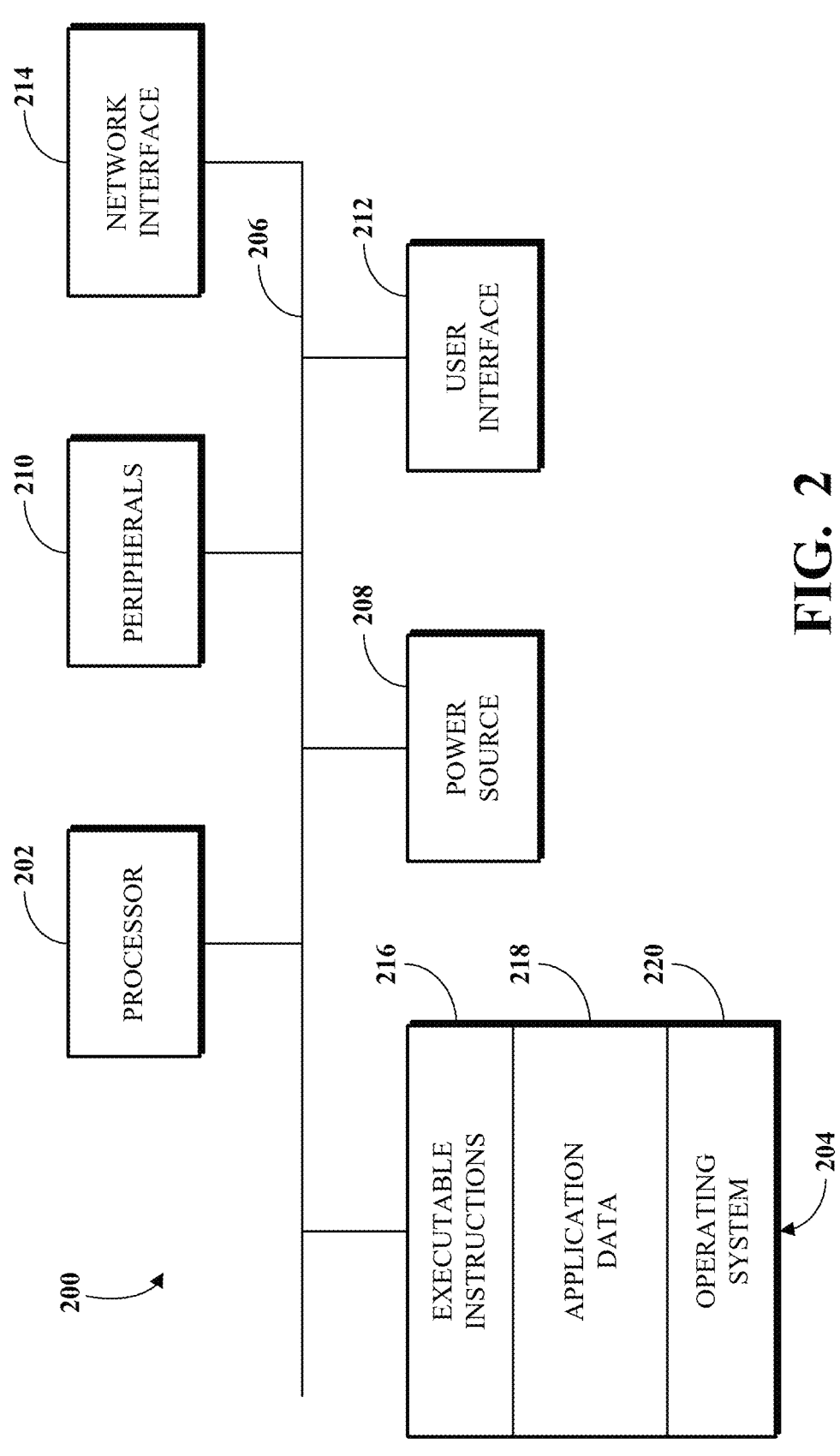
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
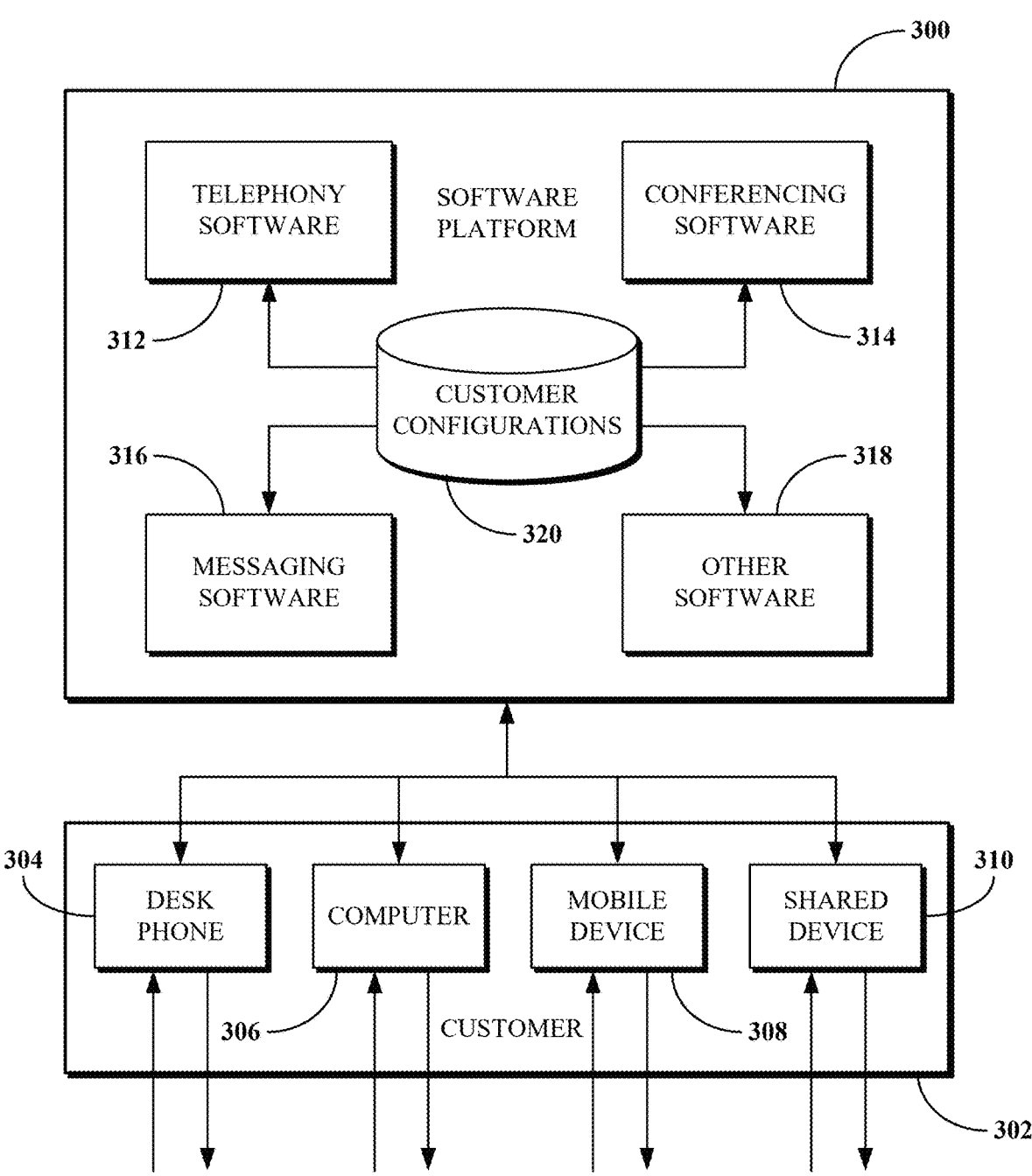
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include contact center software and/or contact center quality management control software.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
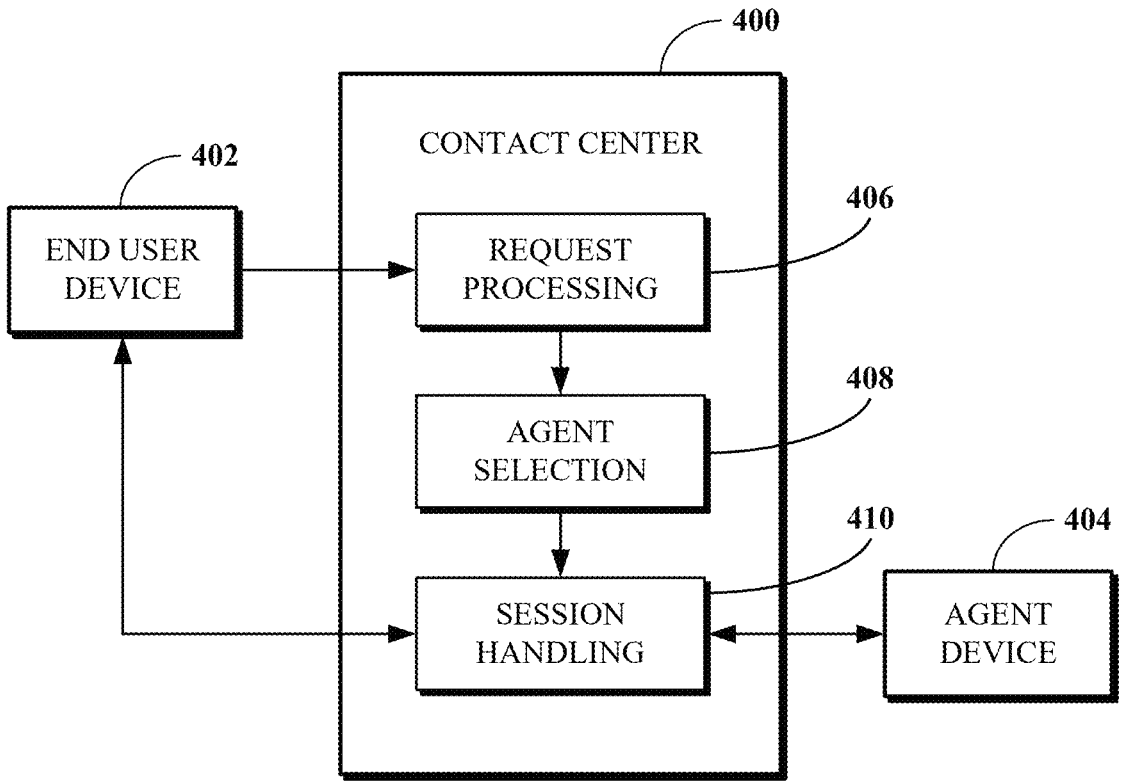
FIG. 4 is a block diagram of an example of a contact center system.

FIG. 4 is a block diagram of an example of a contact center system. A contact center 400, which in some cases may be implemented in connection with a software platform (e.g., the software platform 300 shown in FIG. 3), is accessed by a user device 402 and used to establish a connection between the user device 402 and an agent device 404 over one of multiple modalities available for use with the contact center 400, for example, telephony, video, text messaging, chat, and social media. The contact center 400 is implemented using one or more servers and software running thereon. For example, the contact center 400 may be implemented using one or more of the servers 108 through 112 shown in FIG. 1, and may use communication software such as or similar to the software 312 through 318 shown in FIG. 3. The contact center 400 includes software for facilitating contact center interactions requested by user devices such as the user device 402. As shown, the software includes request processing software 406, agent selection software 408, and session handling software 410.

The request processing software 406 processes a request for a contact center interaction initiated by the user device 402 to determine information associated with the request. The request may include a natural language query or a request entered in another manner (e.g., "press 1 to pay a bill, press 2 to request service"). The information associated with the request generally includes information identifying the purpose of the request and which is usable to direct the request traffic to a contact center agent capable of addressing the request. The information associated with the request may include information obtained from a user of the user device 402 after the request is initiated. For example, for the telephony modality, the request processing software 406 may use an interactive voice response (IVR) menu to prompt the user of the user device to present information associated with the purpose of the request, such as by identifying a category or sub-category of support requested. In another example, for the video modality, the request processing software 406 may use a form or other interactive user interface to prompt a user of the user device 402 to select options which correspond to the purpose of the request. In yet another example, for the chat modality, the request processing software 406 may ask the user of the user device 402 to summarize the purpose of the request (e.g., the natural language query) via text and thereafter process the text entered by the user device 402 using natural language processing and/or other processing.

The session handling software 410 establishes a connection between the user device 402 and the agent device 404, which is the device of the agent selected by the agent selection software 408. The particular manner of the connection and the process for establishing same may be based on the modality used for the contact center interaction requested by the user device 402. The contact center interaction is then facilitated over the established connection. For example, facilitating the contact center interaction over the established connection can include enabling the user of the user device 402 and the selected agent associated with the agent device 404 to engage in a discussion over the subject modality to address the purpose of the request from the user device 402. The facilitation of the contact center interaction over the established connection can use communication software implemented in connection with a software platform, for example, one of the software 312 through 318, or like software.

The user device 402 is a device configured to initiate a request for a contact center interaction which may be obtained and processed using the request processing software 406. In some cases, the user device 402 may be a client device, for example, one of the clients 304 through 310 shown in FIG. 3. For example, the user device 402 may use a client application running thereat to initiate the request for the contact center interaction. In another example, the connection between the user device 402 and the agent device 404 may be established using software available to a client application running at the user device 402. Alternatively, in some cases, the user device 402 may be other than a client device.

The agent device 404 is a device configured for use by a contact center agent. Where the contact center agent is a human, the agent device 404 is a device having a user interface. In some such cases, the agent device 404 may be a client device, for example, one of the clients 304 through 310, or a non-client device. In some such cases, the agent device 404 may be a server which implements software usable by one or more contact center agents to address contact center interactions requested by contact center users. Where the contact center agent is a non-human, the agent device 404 is a device that may or may not have a user interface. For example, in some such cases, the agent device 404 may be a server which implements software of or otherwise usable in connection with the contact center 400.

Although the request processing software 406, the agent selection software 408, and the session handling software 410 are shown as separate software components, in some implementations, some or all of the request processing software 406, the agent selection software 408, and the session handling software 410 may be combined. For example, the contact center 400 may be or include a single software component which performs the functionality of all of the request processing software 406, the agent selection software 408, and the session handling software 410. In some implementations, one or more of the request processing software 406, the agent selection software 408, or the session handling software 410 may be comprised of multiple software components. In some implementations, the contact center 400 may include software components other than the request processing software 406, the agent selection software 408, and the session handling software 410, such as in addition to or in place of one or more of the request processing software 406, the agent selection software 408, and the session handling software 410.

Figure 5:
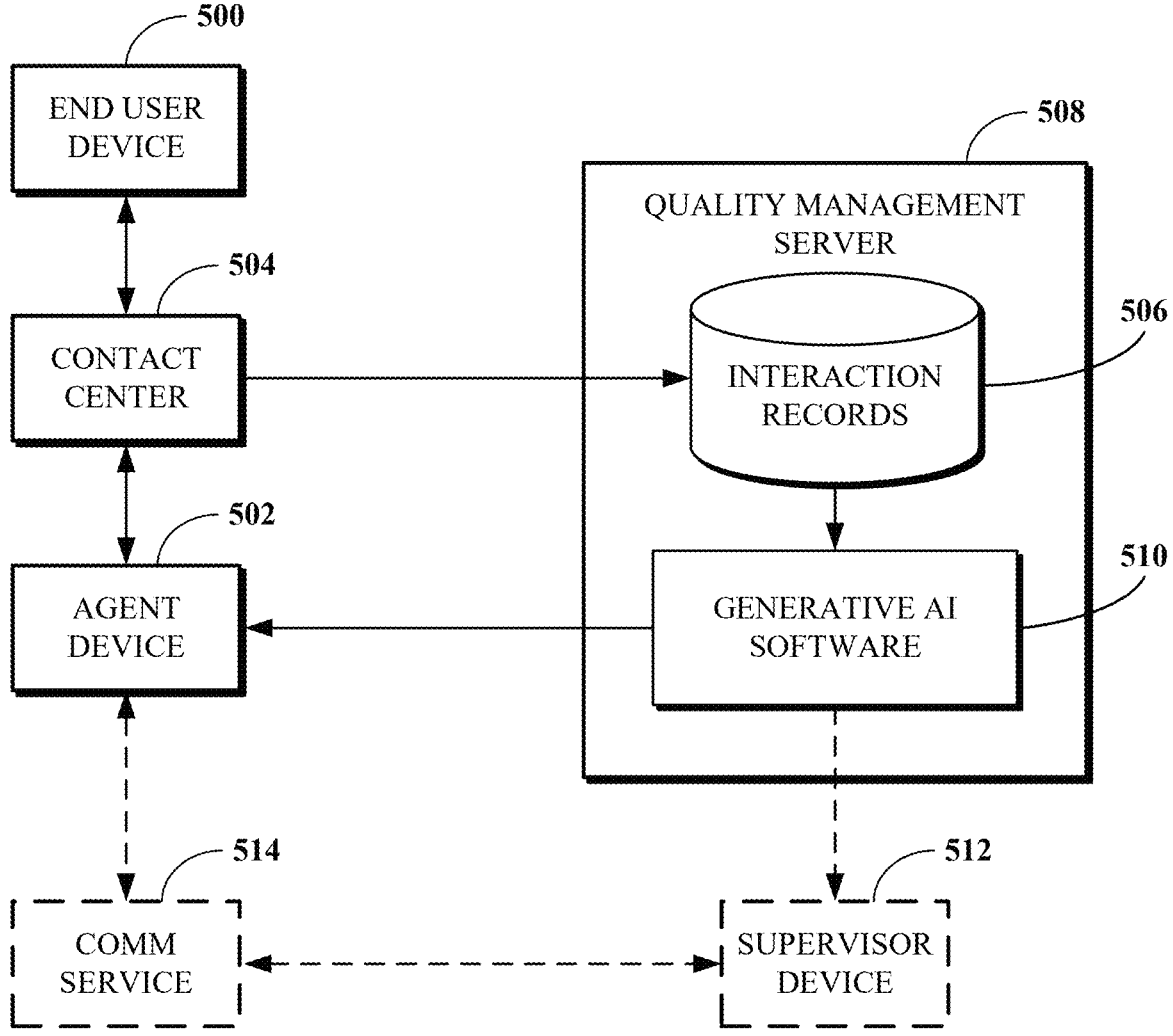
FIG. 5 is a block diagram of an example quality management control functionality of a contact center system.

FIG. 5 is a block diagram of an example quality management control functionality of a contact center system, for example, the contact center system shown in FIG. 4. As shown, an end user, using an end user device 500, and an agent, using an agent device 502, may communicate over a communication modality (e.g., telephony, video conference, chat message, or text message) via a contact center interaction facilitated using a contact center 504. For example, the end user device 500, the agent device 502, and the contact center 504 may respectively be the end user device 402, the agent device 404, and the contact center 400 shown in FIG. 4. The communication modality may, for example, be facilitated using a software service of a software platform, for example, via one of the software 310 through 318 shown in FIG. 3.

Recording information associated with the contact center interaction may be generated (i.e., during the contact center interaction and/or after the contact center interaction ends) and stored within an interaction records data store 506 at a quality management server 508 (e.g., a server used in connection with the contact center 504 or a software platform used to operate the contact center 504, such as the software platform 300 shown in FIG. 3). For example, the recording information may include a recording of the contact center interaction, such as where a synchronous communication modality (e.g., telephony or video conferencing) is used for the contact center interaction. The recording may thus include audio and/or video media. In another example, the recording information may include messages communicated by the end user and/or agent during the contact center engagement, such as where an asynchronous communication modality (e.g., chat or text messaging) is used for the contact center interaction. In some cases, the recording information may also include metadata and/or other information associated with the substantive contents of the contact center interaction. For example, the recording information may include a transcription of some or all of the contact center interaction and/or messages shared via a secondary modality (e.g., chat) while the contact center interaction is mainly facilitated via a primary, synchronous communication modality (e.g., video).

In some cases, the recording information may also include a summary of some or all of the contact center interaction. For example, an AI model, such as a large language model (LLM) trained for summary generation using a set of text input, may process a transcription of a contact center interaction facilitated using a synchronous communication modality or messages of a contact center interaction facilitated using an asynchronous communication modality to generate a summary of some or all of the contact center interaction. The summary may, for example, include text synthesized to represent portions of the discussion of the contact center interaction with attributions to the speaker. In some cases, related information describing end user activity, agent activity, end user sentiment, agent sentiment, and/or the like may be included in the summary. For example, the summary may include descriptions of such related information interspersed with substantive discussion summary content to indicate a greater level of detail with respect to the portions of the contact center interaction.

At some point after the recording information associated with a contact center interaction is stored within the interaction records data store 506 (e.g., immediately upon such storage or some specified or unspecified amount of time thereafter), generative AI software 510 running at the quality management server 508 obtains (e.g., retrieves, such as by accessing the interaction records data store 506) the recording information from the interaction records data store 506 and processes the obtained recording information to determine (e.g., generate) a quality management output representative of a performance of the agent during the contact center interaction. The generative AI software 510 may then generate an agent report based on the quality management output to enable an automated actioning of the quality management output in one or more ways by the agent or another person associated with the contact center (e.g., a supervisor or other managerial personnel of the agent).

The quality management output may be expressed in one of many possible different formats and thus include content corresponding to one or more of various content types. For example, the quality management output may include information indicating a number of good questions, topic mentions, and/or indicator references by the agent during the contact center interaction, in which a good question refers to a question that meaningfully advanced the contact center interaction, a topic mention refers to the agent mentioning a topic or something related to a topic, and an indicator reference refers to a defined name, label, or other identifier for a product, service, entity, or the like. In another example, the quality management output may include a summary of the contact center interaction and/or of key performance indicator values for the agent according to their performance during the contact center interaction. In yet another example, the quality management output may include information indicative of one or more practice, training, or related content areas that the agent may need to review based on relevant shortcomings in the performance of the agent during the contact center interaction. In still a further example, the quality management output may include information indicative of AI-generated comments for review by the agent or another person associated with the contact center. In some cases, two or more of these examples may be combined. The foregoing examples are non-limiting and as such other examples of the quality management output are possible.

The generative AI software 510 may determine the quality management output for a contact center interaction by extracting insights from the recording information for the contact center interaction. The insights that the generative AI software 510 is trained to extract correspond to metrics and other measurable qualities defined for evaluating contact center agent performance. In particular, the generative AI software 510 leverages a generative AI model (e.g., an LLM), a machine learning model (e.g., a deep learning model), or another AI model which is trained based on a set of past contact center interaction recording information (with identity-related and other sensitive or private content culled to protect agent and user privacy) to generate output by correlating keywords, phrases, and like speech and other content to certain topics, indicators, and agent behaviors. The insights may thus indicate whether, for example, the agent explored appropriate topics with the end user and/or responded favorably to comments or questions from the end user in regard to product or competitor mentions.

Furthermore, the insights may differ based on the particular modality of the contact center interaction. For example, where the contact center interaction is over the telephony modality, the insights may be extracted based only on speech and/or like audio from the contact center agent (and, in some cases, from the end user, as well). In another example, where the contact center interaction is over the video conferencing modality, the insights may be extracted based on both speech and/or like audio as well as visual media contents. The visual media contents from which insights may be extracted by the generative AI software 510 may, for example, include one or more of a video stream of the agent, a video stream of the end user, or media presented during a screen share operation of the contact center interaction.

In some cases, extracting insights from the recording information for a contact center interaction and using the extracted insights to determine a quality management output for the contact center interaction can include the generative AI software 510 producing an AI-generated scorecard for the agent. The AI-generated scorecard may be based on one or more metrics generally relevant to all contact center interactions and/or agents. For example, the one or more metrics may correspond to a greeting spoken by the agent to the end user, a measure of the agent's recognition of the end user's inquiry, and/or an indication of whether a sentiment of the end user remained above a threshold for the duration of the contact center interaction. The AI-generated scorecard may additionally or alternatively be based on one or more metrics specific to the particular contact center interaction and/or agent. For example, the one or more metrics may correspond to whether the agent's proposed resolution for the end user's inquiry is consistent with a policy of the company for which the contact center is operated, whether the agent repeated an error that they caused on a preceding contact center interaction with the same or a different end user, and/or whether the agent leveraged the proper knowledgebase articles or like tools to address the end user's inquiry. The AI-generated scorecard may, for example, be presented within an agent report (i.e., generated as output by the generative AI software 510).

In some cases, extracting insights from the recording information for a contact center interaction and using the extracted insights to determine a quality management output for the contact center interaction can include the generative AI software 510 determining AI-generated comments to present to the agent outside of a scorecard. For example, the generative AI software 510 may generate a timeline for the contact center interaction in which extracted insights are correlated to specific times along the timeline (e.g., based on when the insights or content associated therewith occur during the contact center interaction). The timeline may, for example, include insights based on speech and/or like content from the agent as well as insights based on speech and/or like content from the end user. In some cases, the timeline may also include comments generated by the generative AI software 510 according to ones of those insights. The timeline may, for example, be presented within an agent report.

In some cases, extracting insights from the recording information for a contact center interaction and using the extracted insights to determine a quality management output for the contact center interaction can include the generative AI software 510 performing an optical character recognition (OCR) or like process against visual content of the recording information for the contact center interaction. For example, text within screen share content presented by the agent during the contact center interaction can be processed using OCR and extracted (e.g., copied to a system cache). The screen share content may, for example, refer to or otherwise include content shared directly by the end user while the end user controls the end user device 500 or indirectly by the end user while the agent controls the end user device 500 (e.g., during a share operation in which the agent is granted permission to remotely access and control the end user device 502). Performing OCR against the text within screen share content enables searching through the text (and thus through the discussion of the contact center interaction). That extracted text content can then be used in one or more ways as described above, for example, to determine an AI-generated scorecard, an AI-generated comment for a timeline, or the like. In some cases, where the generative AI software 510 determines that such extracted text content includes information that may be sensitive or private (e.g., identity information such as a social security number or confidential information related to a product or service), the generative AI software 510 may push a change to the recording information stored within the interaction records data store 506 to prevent an exposure of that sensitive or private information to others. For example, the generative AI software 510 may introduce a blurring effect to filter or otherwise obfuscate such sensitive or private text content. In some cases, an AI model used by the generative AI software 510 for the insight extraction can be trained to filter or otherwise obfuscate such sensitive or private text content. In some such cases, the AI model can be retrained (e.g., updated) according to sensitive or private content detected in connection with a current contact center interaction to update an understanding of content to process.

Thus, the recording information may in some cases include visual content output for display at the end user device 500 during the contact center interaction (e.g., shared directly by the end user while the end user controls the end user device 500 or indirectly as a result of, for example, an agent remotely accessing and controlling the end user device 500). Similarly, the recording information may in some cases also or instead include visual content output for display at the agent device 502 during the contact center interaction. For example, the recording information may include one or more image and/or video contents visually depicting activity at the agent device 502 during some or all of the contact center interaction. In another example, the recording information may include text representative of activity visually depicted at the agent deice 502 during some or all of the contact center interaction (e.g., generated using a classification model trained for visual activity classification). Extracting the insights from the recording information may thus include processing such agent activity information as part of the process for generating the agent report.

In some cases, extracting insights from the recording information can include determining and/or translating a spoken language represented within a transcription or recording of the contact center interaction. For example, the transcription or recording may be processed to determine a most prevalent language of the contact center interaction, and language translation may then be performed according to the most prevalent language. Determining the most prevalent language may, for example, include, for each speech that occurred during the contact center interaction (i.e., anything spoken by the end user or the agent), detecting a language of that speech and determining, as the most prevalent language, a most frequently detected language. In such a case, extracting the insights can include translating speech not detected in the most prevalent language and/or indicating the most prevalent language within the agent report. In another example, the transcription or recording may be processed to determine that the language spoken by one or both of the end user or the agent differs from a default language with which the contact center system is configured to perform quality management as disclosed herein. In such a case, extracting the insights can include translating some or all speech of the contact center interaction into the default language. In some cases, the language determination and/or translation may be performed to process the transcription or recording of the contact center interaction, such as to prepare the recording information of the contact center interaction for storage in the interaction records data store 506, instead of as part of the insight extraction process performed by the generative AI software 510.

In some cases, in addition to or instead of extracting insights as described above, the generative AI software 510 may determine the quality management output for a contact center interaction by using an AI model to evaluate various aspects of agent performance by the agent during the contact center interaction. For example, the AI model may be an LLM trained to receive, as input, the recording information (e.g., as a transcript of a contact center interaction and/or as another textual representation thereof, such as a summary generated using the same or another AI model) and a set of questions usable to evaluate agent performance in one or more ways and to produce, as output, answers indicative of such agent performance. Non-limiting examples of questions related to agent performance which may be evaluated by such an AI model relate to whether the agent demonstrated empathy toward the end user, whether the issue to which the contact center interaction was focused was resolved by the agent, whether the agent acted in accordance with policies of an entity represented by the agent, whether the end user demonstrated an improvement in sentiment during the contact center interaction, or whether the agent used more than a threshold amount of time to address the issue of the end user. The AI model may optionally output a score, such as in addition to or in place of the answers, calculated according to the answers indicative of the agent performance. The answers and/or the score may thus be included in the agent report. In some cases, media such as audio and/or visual content may be used as input to evaluate end user or agent sentiment. For example, visual content, such as video content of a recording of a contact center interaction, may be processed to evaluate a question related to whether the agent sentiment improved relative to a previous contact center interaction facilitated by the agent. Processing visual content in this way may be performed using a classification or other machine learning model trained for visual sentiment analysis.

In some cases, determining the quality management output for the contact center interaction can include the generative AI software 510 determining one or more practice, training, or related content areas that the agent may need to review. The generative AI software 510 may then automatically, responsive to that determination, generate a simulated contact center interaction for the agent to participate in where the generative AI software 510 operates as an end user and tasks the agent with accurately addressing the one or more practice, training, or related content areas. The simulated contact center interaction may, for example, be accessible to the agent via an agent report (e.g., by the agent interacting with a hyperlink included in the agent report). For example, the simulated contact center interaction may be generated based on insights extracted from the recording information for the contact center interaction and/or based on score or answer output produced based on questions related to agent performance during the contact center interaction. The simulated contact center interaction may be of a same communication modality as the contact center interaction based on which it is generated. For example, where the simulated contact center interaction is generated based on a contact center interaction facilitated via video conference, the hyperlink included in the agent report usable to connect the agent to the simulated contact center interaction can be a hyperlink usable to connect to a video conference. The simulated contact center interaction may include presenting simulated end user media to the agent in one or more forms. For example, the generative AI software 510, via a generative AI model configured to generate audiovisual content, may generate an audiovisual recording representing depictions and speech of someone who may pass off as an end user of contact center services. In another example, the simulated end user may be represented using an AI chatbot facilitated by an LLM. The generated content may include breaks during which the agent may speak or otherwise act to address the simulated end user issues. Performance of the agent during such a simulated contact center interaction may be scored in a manner as described above, for example, using recording information captured for the simulated contact center interaction. In some cases, the simulated contact center interaction may include a real-time virtual coach element implemented using an AI model. For example, the virtual coach may respond to agent speech and/or activity in real-time to share praise for positive agent behavior or constructive criticism and redirection for negative agent behavior. In some cases, the virtual coach may instead be implemented at an end of the simulated contact center interaction to provide a summary of the agent performance during the simulated contact center interaction.

An agent report generated based on the quality management output for a contact center interaction may be presented within a user interface accessible to an agent or other contact center personnel via a client application or web application. For example, the generative AI software 510 may generate (or cause to be generated) and transmit (or cause to be transmitted) such a user interface to the agent device 502 to enable the agent to review the contents of the agent report and take immediate action thereon. The generative AI software 510 may optionally also transmit (or cause to be transmitted) the same or a similar user interface to a supervisor device 512 (operated by the agent's supervisor or another quality management personnel) to enable the operator of the supervisor device 512 to review the agent report. The operator of the supervisor device 512 may, for example, add comments within the agent report (e.g., within a section dedicated to supervisor/quality management personnel comments or within another section, such as a timeline of insights). The operator of the supervisor device 512 may optionally initiate a communication with the agent over a communication service 514 of the software platform, for example, one of the software 312 through 318 shown in FIG. 3, to address comments and/or the agent report with the agent.

In some cases, the supervisor device 512 may receive a notification related to the agent report based on a subscription and/or confidence score defined for the operator of the supervisor device 512. For example, the operator of the supervisor device 512 may define a subscription to cause the generative AI software 510 to transmit a notification to the supervisor device 512 whenever a particular topic is identified in connection with an agent report. In another example, the operator of the supervisor device 512 may define a subscription to cause the generative AI software 510 to transmit a notification to the supervisor device 512 whenever a particular agent addresses one or more of a set of topics, based on the agent report. In yet another example, the generative AI software 510 may assign a confidence score to output presented within an agent report and the subscription defined for the operator of the supervisor device 512 may limit notifications to situations where the confidence score meets or exceeds a threshold. For example, a confidence score may be determined based on a sematic evaluation by a trained prediction (e.g., machine learning) model of subject content associated with the contact center interaction. The notification, regardless of the contents thereof or the manner by which it is determined to be presented, may be presented via one or more of email, text message, chat message, or push notification.

The recording information is described above as being generated within a contact center system or otherwise within a software platform associated with (e.g., that implements or otherwise facilitates software services used by the contact center system). However, in some cases, the recording information may wholly or partially originate from a source external to the contact center system and/or the software platform. For example, the contact center system may obtain the recording information from a source external to the contact center system based on a completion of a contact center interaction facilitated by the contact center system or otherwise based on the contact center interaction. In some cases, the contact center system (e.g., via or otherwise using the quality management server 508) may cause the recording information to be stored within the interaction records data store 506 upon receipt of the recording information from the source external to the contact center system. In other cases, the contact center system may omit storing the recording information obtained from the source external to the contact center system and instead begin processing such recording information using the generative AI software 510 independent of (i.e., without) a prior storage of the recording information within or otherwise in connection with the contact center system.

Figure 6:
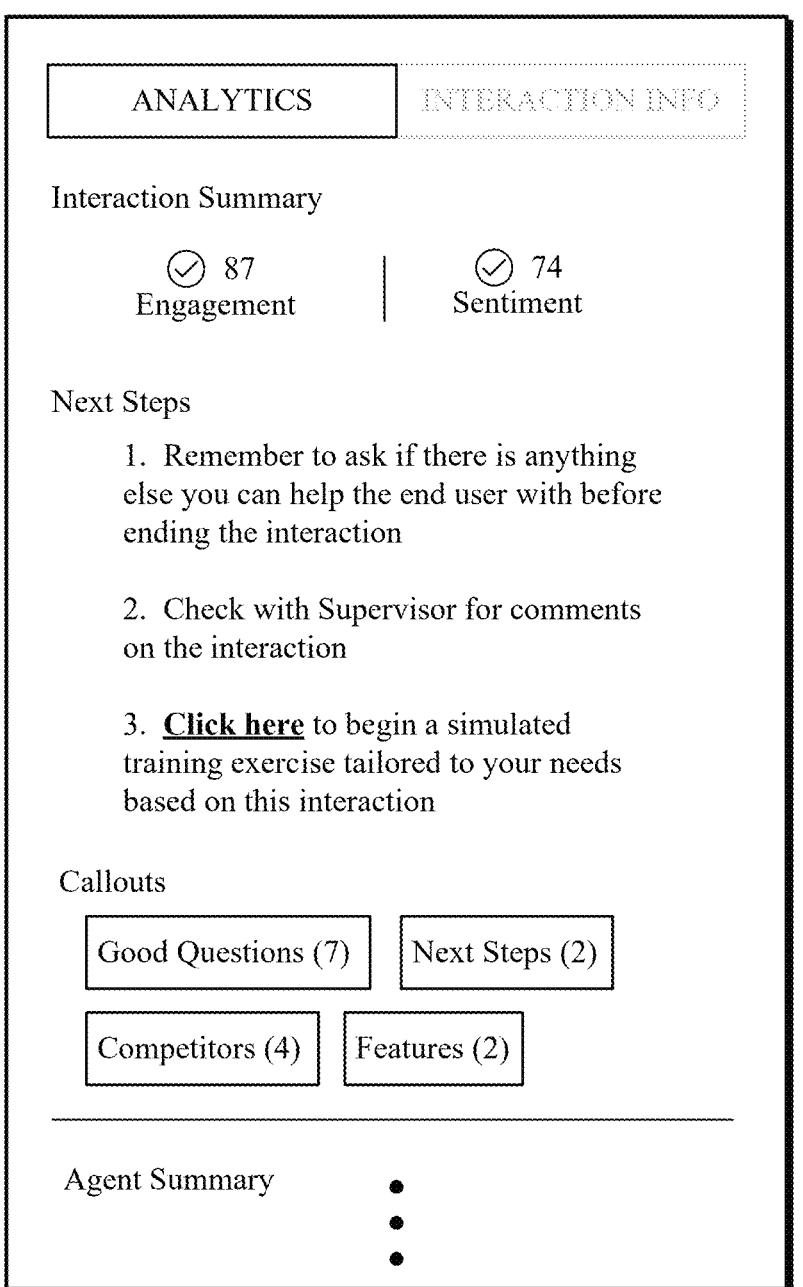
FIG. 6 is an illustration of a first example of contents included in an agent report generated based on a quality management output for a contact center interaction.

FIG. 6 is an illustration of a first example of contents included in an agent report generated based on a quality management output for a contact center interaction. In particular, FIG. 6 shows an agent report 600 which details engagement and sentiment scores for the subject contact center interaction, next steps determined based on a quality management output determined for the contact center interaction (e.g., by the generative AI software 510 shown in FIG. 5), callouts indicating occurrences of select questions, topics, and indicators, and a summary of the agent performance. For example, in the Next Steps section, an AI-generated recommendation to remember to ask if there is anything else the agent can help the end user with before ending the interaction is presented, along with a hyperlink at which a simulated contact center interaction generated for the agent may be accessed.

Figure 7:
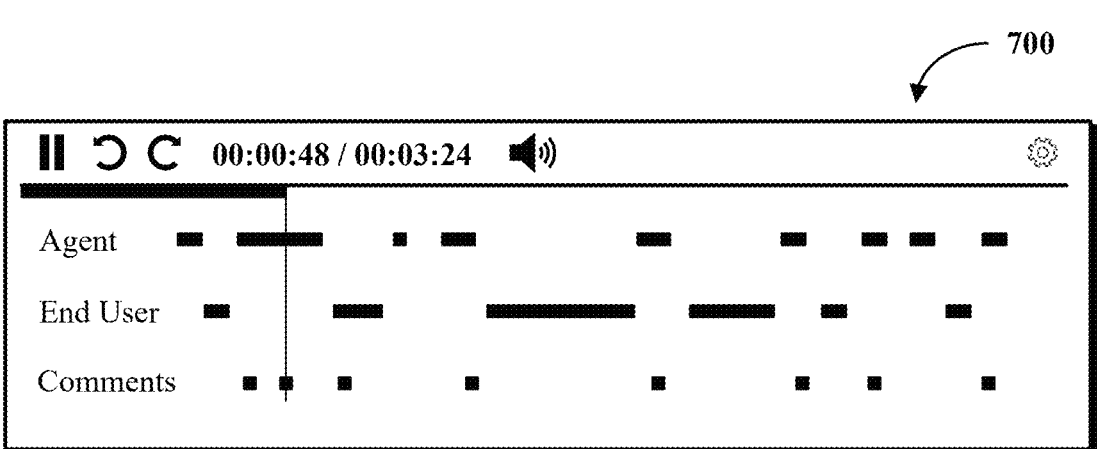
FIG. 7 is an illustration of a second example of contents 45 included in an agent report generated based on a quality management output for a contact center interaction.
Figure 7:
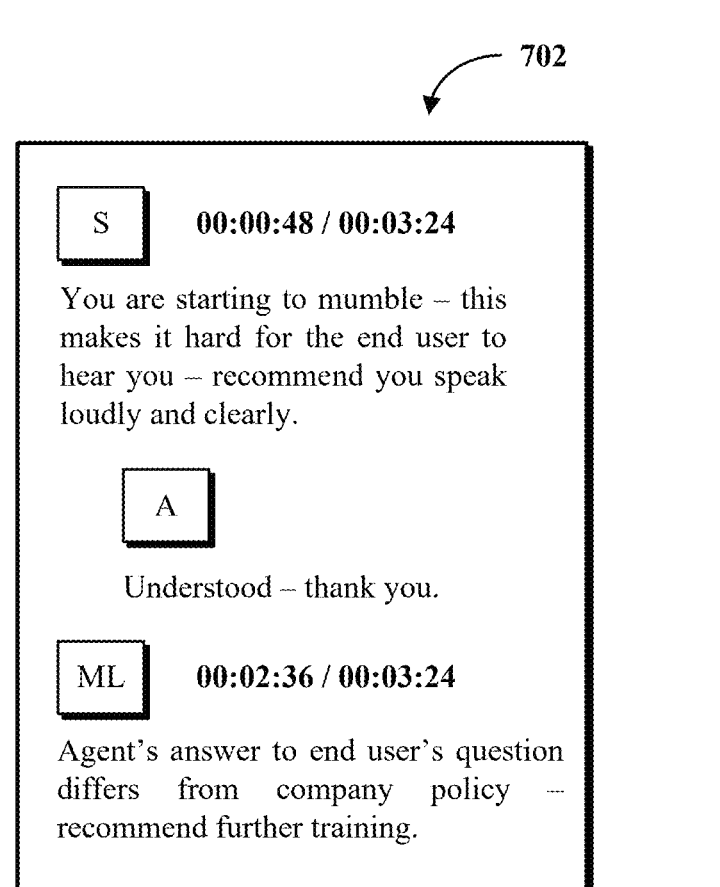

FIG. 7 is an illustration of a second example of contents included in an agent report generated based on a quality management output for a contact center interaction. In particular, FIG. 7 shows a timeline 700 of insights generated to show insights extracted for the agent and the end user, along with comments generated by AI or a device user (e.g., the agent, a supervisor, and/or another quality management personnel), according to the times during the contact center interaction at which those insights and comments are relevant. FIG. 7 also shows a comment list 702 which, by example, includes a supervisor comment (represented by the "S"), a response to the supervisor comment by the agent (represented by the "A"), and an AI-generated comment (represented by the "ML"), which comments may, for example, correspond to markings presented in the comments line of the timeline 700.

To further describe some implementations in greater detail, reference is next made to examples of techniques which may be performed by or using a system for contact center quality management control. FIG. 8 is a flowchart of an example of a technique 800 for contact center quality management control. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, recording information associated with a contact center interaction between an agent and an end user is obtained. At 804, the recording information is processed using a generative AI model to determine a quality management output for the contact center interaction. At 806, a simulated training session is optionally generated for agent completion based on the quality management output. At 808, an agent report detailing the quality management output and associated materials (e.g., a hyperlink usable to access the simulated training session) is generated and made available for automated actioning (e.g., for agent and/or other personnel review).

The implementations of this disclosure describe methods, systems, devices, apparatuses, and non-transitory computer readable media for generating a quality management output relative to agent performance during a contact center interaction using a trained generative AI model and automating the reporting and further action of such quality management output. In some implementations, a method comprises, a non-transitory computer readable medium stores instructions operable to cause one or more processors to perform operations comprising, and/or a system comprises a memory subsystem storing instructions and processing circuitry configured to execute the instructions for: obtaining recording information associated with a contact center interaction between an agent and an end user; processing the recording information using a generative artificial intelligence model to determine a quality management output for the contact center interaction; and generating an agent report based on the quality management output and associated materials.

In some implementations of the method, the non-transitory computer readable medium, and/or the system, the method comprises, the operations comprise, and/or the processing circuitry is configured to execute the instructions for: generating, using the generative artificial intelligence model, a simulated training session for the agent based on the quality management output, wherein the agent report includes a hyperlink at which the simulated training session is accessible.

In some implementations of the method, the non-transitory computer readable medium, and/or the system, the method comprises, the operations comprise, and/or the processing circuitry is configured to execute the instructions for: transmitting the agent report to a supervisor device associated with the agent.

In some implementations of the method, the non-transitory computer readable medium, and/or the system, processing the recording information using the generative artificial intelligence model to determine the quality management output for the contact center interaction comprises: extracting, using the generative artificial intelligence model, insights from the recording information; and determining the quality management output based on the insights.

In some implementations of the method, the non-transitory computer readable medium, and/or the system, processing the recording information using the generative artificial intelligence model to determine the quality management output for the contact center interaction comprises: evaluating, using the generative artificial intelligence model, agent performance during the contact center interaction using the recording information to determine a score for the agent; and determining the quality management output based on the score for the agent.

In some implementations of the method, the non-transitory computer readable medium, and/or the system, generating the agent report based on the quality management output and associated materials comprises: including a timeline of insights with one or more comments generated using the generative artificial intelligence model within the agent report.

In some implementations of the method, the non-transitory computer readable medium, and/or the system, the contact center interaction is facilitated via a video conference and the recording information corresponds to a transcription of the video conference.

In some implementations of the method, the non-transitory computer readable medium, and/or the system, the contact center interaction is facilitated via a chat message conversation or text message conversation and the recording information corresponds to messages of the chat message conversation or of the text message conversation.

In some implementations of the method, the non-transitory computer readable medium, and/or the system, the method comprises, the operations comprise, and/or the processing circuitry is configured to execute the instructions for: generating, based on the quality management output, a simulated contact center interaction for the agent.

In some implementations of the method, the non-transitory computer readable medium, and/or the system, the quality management output is determined based on insights extracted from the recording information using the generative artificial intelligence model.

In some implementations of the method, the non-transitory computer readable medium, and/or the system, the quality management output is determined based on a score determined by evaluating agent performance during the contact center interaction according to the recording information.

In some implementations of the method, the non-transitory computer readable medium, and/or the system, the agent report is accessible to a supervisor device associated with the agent.

In some implementations of the method, the non-transitory computer readable medium, and/or the system, the agent report visually represents comments generated using the generative artificial intelligence model in a timeline format.

In some implementations of the method, the non-transitory computer readable medium, and/or the system, processing the recording information using the generative artificial intelligence model to determine the quality management output for the contact center interaction comprises: determining the quality management output based on insights extracted using the generative artificial intelligence model from the recording information.

In some implementations of the method, the non-transitory computer readable medium, and/or the system, processing the recording information using the generative artificial intelligence model to determine the quality management output for the contact center interaction comprises: determining the quality management output based on a score determined for the agent by the generative artificial intelligence model evaluating agent performance during the contact center interaction using the recording information.

In some implementations of the method, the non-transitory computer readable medium, and/or the system, the agent report includes a hyperlink to a simulated contact center interaction generated based on the quality management output.

In some implementations of the method, the non-transitory computer readable medium, and/or the system, the agent report includes a timeline of insights including one or more comments generated using the generative artificial intelligence model.

In some implementations of the method, the non-transitory computer readable medium, and/or the system, the contact center interaction is facilitated using a synchronous or asynchronous communication service of a unified communications as a service software platform.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively, or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

generating, by a first large language model of a contact center system, a summary of a contact center interaction based on a transcription of the contact center interaction, wherein the contact center interaction is facilitated by the contact center system between an agent device and a user device and corresponds to a video communication modality or an asynchronous communication modality;

determining, by a second large language model of the contact center system retrieving recording information associated with the contact center interaction from a data store in which the recording information is stored and processing the recording information, a quality management output for the contact center interaction, wherein the recording information includes the summary of the contact center interaction and indicates an evaluation of agent performance during the contact center interaction;

generating, by the second large language model processing the quality management output, a simulated contact center interaction that includes simulated end user media to present to the agent device, wherein the simulated end user media includes video content configured for real-time response by an agent using the agent device and corresponds to the video communication modality; and outputting, to the agent device, an agent report that includes a hyperlink usable for the agent device to access the simulated contact center interaction and respond to the video content.

2. The method of claim 1, comprising:

transmitting the agent report to a supervisor device associated with the agent.

3. The method of claim 1, wherein determining the quality management output for the contact center interaction comprises:

extracting, using the second large language model, insights from the recording information; and determining the quality management output based on the insights.

4. The method of claim 1, wherein determining the quality management output for the contact center interaction comprises:

evaluating, using the second large language model, agent performance during the contact center interaction using the recording information to determine a score for the agent; and determining the quality management output based on the score for the agent.

5. The method of claim 1, wherein outputting the agent report comprises:

including a timeline of insights with one or more comments generated using the second large language model within the agent report.

6. The method of claim 1, wherein the contact center interaction is facilitated via a video conference implemented by a contact center as a service platform.

7. The method of claim 1, wherein the contact center interaction includes a chat message conversation or text message conversation and the recording information corresponds to messages of the chat message conversation or of the text message conversation.

8. The method of claim 1, comprising:

filtering, by the second large language model, sensitive or private content of the recording information.

9. A non-transitory computer readable medium storing instructions operable to cause one or more processors to perform operations comprising:

generating, by a first large language model of a contact center system, a summary of a contact center interaction based on a transcription of the contact center interaction, wherein the contact center interaction is facilitated by the contact center system between an agent device and a user device and corresponds to a video communication modality or an asynchronous communication modality;

determining, by a second large language model of the contact center system retrieving recording information associated with the contact center interaction from a data store in which the recording information is stored and processing the recording information, a quality management output for the contact center interaction, wherein the recording information includes the summary of the contact center interaction and indicates an evaluation of agent performance during the contact center interaction;

generating, by the second large language model processing the quality management output, simulated contact center interaction that includes simulated end user media to present to the agent device, wherein the simulated end user media includes video content configured for real-time response by an agent using the agent device and corresponds to the video communication modality; and outputting, to the agent device, an agent report that includes a hyperlink usable for the agent device to access the simulated contact center interaction and respond to the video content.

10. The non-transitory computer readable medium of claim 9, wherein the quality management output is determined based on insights extracted from the recording information using the second large language model.

11. The non-transitory computer readable medium of claim 9, wherein the quality management output is determined based on a score determined by evaluating agent performance during the contact center interaction according to the recording information.

12. The non-transitory computer readable medium of claim 9, wherein the agent report is accessible to a supervisor device associated with the agent.

13. The non-transitory computer readable medium of claim 9, wherein the agent report visually represents comments generated using the second large language model in a timeline format.

14. The non-transitory computer readable medium of claim 9, wherein the second large language model filters sensitive or private content of the recording information.

15. A system, comprising:

a memory subsystem; and processing circuitry configured to execute instructions stored in the memory subsystem to:

generate, by a first large language model of a contact center system, a summary of a contact center interaction based on a transcription of the contact center interaction, wherein the contact center interaction is facilitated by the contact center system between an agent device and a user device and corresponds to a video communication modality or an asynchronous communication modality;

determine, by a second large language model of the contact center system retrieving recording information associated with the contact center interaction from a data store in which the recording information is stored and processing the recording information, a quality management output for the contact center interaction, wherein the recording information includes the summary of the contact center interaction and indicates an evaluation of agent performance during the contact center interaction;

generate, by the second large language model processing the quality management output, a simulated contact center interaction that includes simulated end user media to present to the agent device, wherein the simulated end user media includes video content configured for real-time response by an agent using the agent device and corresponds to the video communication modality; and output, to the agent device, an agent report that includes a hyperlink usable for the agent device to access the simulated contact center interaction and respond to the video content.

16. The system of claim 15, wherein, to determine the quality management output for the contact center interaction, the processing circuitry is configured to execute the instructions to:

determine the quality management output based on insights extracted using the second large language model from the recording information.

17. The system of claim 15, wherein, to determine the quality management output for the contact center interaction, the processing circuitry is configured to execute the instructions to:

determine the quality management output based on a score determined for the agent by the second large language model evaluating agent performance during the contact center interaction using the recording information.

18. The system of claim 15, wherein the agent report includes a timeline of insights including one or more comments generated using the second large language model.

19. The system of claim 15, wherein the contact center interaction is facilitated using a synchronous communication service of a unified communications as a service software platform or of a contact center as a service platform.

20. The system of claim 15, wherein sensitive or private content of the recording information is filtered to determine the quality management output.

\* \* \* \* \*